(12) United States Patent
Yuan et al.

(10) Patent No.: US 12,091,501 B2
(45) Date of Patent: Sep. 17, 2024

(54) METHOD FOR PREPARING POLYESTER POLYOL

(71) Applicant: DALIAN INSTITUTE OF CHEMICAL PHYSICS, CHINESE ACADEMY OF SCIENCES, Dalian (CN)

(72) Inventors: Danhua Yuan, Dalian (CN); Jiacheng Xing, Dalian (CN); Yunpeng Xu, Dalian (CN); Zhongmin Liu, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 702 days.

(21) Appl. No.: 17/293,899

(22) PCT Filed: Nov. 15, 2018

(86) PCT No.: PCT/CN2018/115722
§ 371 (c)(1),
(2) Date: May 13, 2021

(87) PCT Pub. No.: WO2020/097879
PCT Pub. Date: May 22, 2020

(65) Prior Publication Data
US 2022/0002481 A1    Jan. 6, 2022

(51) Int. Cl.
| | | |
|---|---|---|
| *C08G 63/83* | (2006.01) | |
| *C08G 63/68* | (2006.01) | |
| *C08G 63/692* | (2006.01) | |
| *C08G 63/695* | (2006.01) | |
| *C08G 63/698* | (2006.01) | |
| *C08G 63/84* | (2006.01) | |
| *C08G 63/85* | (2006.01) | |
| *C08G 63/86* | (2006.01) | |
| *C08G 63/87* | (2006.01) | |

(52) U.S. Cl.
CPC ......... *C08G 63/698* (2013.01); *C08G 63/681* (2013.01); *C08G 63/692* (2013.01); *C08G 63/695* (2013.01); *C08G 63/83* (2013.01); *C08G 63/84* (2013.01); *C08G 63/85* (2013.01); *C08G 63/866* (2013.01); *C08G 63/87* (2013.01)

(58) Field of Classification Search
USPC ........................................... 528/8
See application file for complete search history.

(56) References Cited

U.S. PATENT DOCUMENTS

| | | |
|---|---|---|
| 6,703,474 B2 | 3/2004 | Fujimori et al. |
| 10,967,350 B2 | 4/2021 | Zhang et al. |
| 11,179,714 B2 | 11/2021 | Liu et al. |
| 11,311,852 B2 | 4/2022 | Zhang et al. |
| 11,434,183 B2 | 9/2022 | Su et al. |
| 2004/0086733 A1 | 5/2004 | Fujimori et al. |
| 2021/0403332 A1 | 12/2021 | Yuan et al. |
| 2021/0403333 A1 | 12/2021 | Yuan et al. |
| 2022/0002496 A1 | 1/2022 | Xing et al. |
| 2022/0008902 A1 | 1/2022 | Yuan et al. |

FOREIGN PATENT DOCUMENTS

| | | |
|---|---|---|
| CN | 101735436 A | 6/2010 |
| CN | 101747499 A | 6/2010 |
| GB | 2 360 777 A | 10/2001 |
| JP | S60155225 A | 8/1985 |
| JP | H02183267 A | 7/1990 |
| JP | 6-122756 A | 5/1994 |
| RU | 2 178 783 C2 | 5/1999 |
| WO | 02/059178 A1 | 8/2002 |

OTHER PUBLICATIONS

WO2002059178A1 Machine Translation (Year: 2002).*
U.S. Appl. No. 17/262,677, filed Jan. 22, 2021.
U.S. Appl. No. 17/293,900, filed May 13, 2021.
U.S. Appl. No. 17/294,349, filed May 14, 2021.
U.S. Appl. No. 17/294,356, filed May 14, 2021.
U.S. Appl. No. 17/294,357, filed May 14, 2021.

* cited by examiner

*Primary Examiner* — Terressa Boykin
(74) *Attorney, Agent, or Firm* — SEED INTELLECTUAL PROPERTY LAW GROUP LLP

(57) ABSTRACT

The present application discloses a method for preparing polyester polyol comprising performing transesterification of raw materials containing inorganic oxyacid ester and polyhydric alcohol to obtain the polyester polyol. The polyester polyol obtained by the method described in the present application has higher heat resistance.

11 Claims, 1 Drawing Sheet

METHOD FOR PREPARING POLYESTER POLYOL

TECHNICAL FIELD

The present application relates to a method for preparing polyester polyol, which belongs to the field of polymer synthesis.

BACKGROUND

Polyester polyols are prepared by polycondensation of dibasic organic carboxylic acids, carboxylic anhydrides and polyhydric alcohols, and their relative molecular masses are generally less than 4500. Dibasic acids include phthalic acid or phthalic anhydride or its esters, adipic acid, halogenated phthalic acid and so on, and polyhydric alcohols include ethylene glycol, propylene glycol, diethylene glycol, trimethylolpropane, pentaerythritol and so on. The polyester polyols are generally classified based on carboxylic acids, and usually comprise following species: adipic acid polyester polyols, alkyd polyester polyols, caprolactone polyester polyols and acrylic polyester polyols. The methods for preparing polyester polyols include vacuum dehydration method and high temperature nitrogen dehydration method. Vacuum dehydration method refers to that, under vacuum conditions, using acetate as a catalyst, dibasic acid and dihydric alcohol undergo polycondensation reaction to synthesize a certain molecular mass of polyester polyol. High temperature nitrogen dehydration method refers to synthesizing polyester polyol at high temperature under the protection of nitrogen.

Traditional polyester polyols are produced from organic acids, anhydrides or organic acid esters as raw materials, which have poor heat resistance and the initial decomposition temperature is generally lower than 300° C. (see CN106660252A; Synthesis and properties of acrylpimaric acid polyester polyol[J]. Chemistry and Industry of Forest Products, 1999, (02):63-67), and are difficult to apply in fields requiring high heat resistance.

SUMMARY

According to one aspect of the present application, a method for preparing polyester polyol is provided, and the polyester polyol prepared by the method has higher heat resistance.

The polyester polyol polymer of the present application is a new type of polyester polyol polymer obtained by transesterification of inorganic oxyacid ester and polyhydric alcohols as raw materials. In contrast, the traditional polyester polyol is prepared by dehydration esterification reaction of organic acid and polyhydric alcohols as raw materials.

The method for preparing polyester polyol is characterized in that it comprises performing transesterification of raw materials containing inorganic oxyacid ester and polyhydric alcohol to obtain the polyester polyol.

Optionally, the inorganic oxyacid ester is at least one of compounds having a chemical formula shown in Formula I and Formula II:

 Formula I

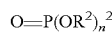 Formula II wherein, M is a metal element or a non-metal element that does not include P, $R^1$ and $R^2$ are independently selected from at least one of $C_1$ to $C_8$ alkyl groups, $n^1=2\sim8$, $n^2=2\sim8$.

Optionally, $n^1=2, 3, 4, 5, 6, 7$, or $8$.

Optionally, $n^2=3$.

Optionally, M comprises at least one of B, Si, Ge, P, Al, Ti, Fe, Sn, V, Ga, Zr, Cr, Sb and W.

Optionally, M is B, Si, Ge, P, Al, Ti, Fe, Sn, V, Ga, Zr, Cr, Sb or W.

Optionally, M is B, Si, Ge, P, Al, Ti, Fe, Sn, V, Ga, Zr, Cr, Sb or W.

Optionally, in the Formula I, $R^1$ and $R^2$ are independently selected from at least one of $C_1$ to $C_4$ alkyl groups.

Optionally, the inorganic oxyacid ester comprises at least one of trimethyl borate, triethyl borate, tripropyl borate, tributyl borate, tri-n-hexyl borate, triisooctyl borate, trioctyl borate, tetramethoxysilane, tetraethyl orthosilicate, tetrapropyl silicate, tetrabutyl silicate, ethyl orthogermanate, triethyl phosphate, tripropyl phosphate, tributyl phosphate, tri-n-pentyl phosphate, trihexyl phosphate, aluminium ethoxide, aluminum isopropoxide, aluminum n-butoxide, aluminum tert-butoxide, tetraethyl titanate, tetraisopropyl titanate, tetrabutyl titanate, tetrahexyl titanate, tetraisooctyl titanate, tetrabutyl ferrite, tetrabutyl stannate, butyl orthovanadate, gallium ethoxide, tetra-n-propyl zirconate, tetrabutyl zirconate, tert-butyl chromate, ethyl antimonite, butyl antimonate, tungsten ethoxide and tungsten isopropoxide.

Optionally, the molar ratio of the inorganic oxyacid ester to the polyhydric alcohol satisfies: inorganic oxyacid ester: polyhydric alcohol=$(0.8\sim1.2)n^3/x$; wherein x is the number of moles of alkoxyl groups contained in each mole of inorganic oxyacid ester, and $n^3$ is the number of moles of hydroxyl groups contained in each mole of polyhydric alcohol.

Optionally, the upper limit of the molar ratio of the inorganic oxyacid ester to the polyol is $0.85n^3/x$, $0.9n^3/x$, $0.95n^3/x$, $1n^3/x$, $1.05n^3/x$, $1.1n^3/x$, $1.15n^3/x$ or $1.2n^3/x$, and the lower limit thereof is $0.8n^3/x$, $0.85n^3/x$, $0.9n^3/x$, $0.95n^3/x$, $1n^3/x$, $1.05n^3/x$, $1.1n^3/x$ or $1.15n^3/x$; wherein, x is the number of moles of alkoxy groups contained in each mole of the inorganic oxyacid ester, and $n^3$ is the number of moles of hydroxyl groups contained in each mole of the polyhydric alcohol.

Optionally, the number of hydroxyl groups in the polyhydric alcohol is not less than two.

Optionally, the polyhydric alcohol comprises at least one of ethylene glycol, diethylene glycol, triethylene glycol, tetraethylene glycol, 1,2-propanediol, 1,3-propanediol, 1,4-butylene glycol, 1,6-hexanediol, polyethylene glycol 200, polyethylene glycol 400, polyethylene glycol 600, polyethylene glycol 800, 1,4-cyclohexanediol, 1,4-cyclohexane dimethanol, terephthalyl alcohol, glycerin, trimethylolpropane, pentaerythritol, xylitol and sorbitol.

Optionally, the formula of the polyhydric alcohol is $R^2$—$(OH)_x$, wherein $x \geq 2$.

Optionally, the molar ratio of the inorganic oxyacid ester to the polyhydric alcohol satisfies: $(0.8\sim1.2)n/x$; wherein, x is the number of moles of alkoxy groups contained in each mole of the inorganic oxyacid ester, and n is the number of moles of hydroxyl groups contained in each mole of the polyhydric alcohol.

Optionally, the transesterification is carried out in the presence of a transesterification catalyst.

Optionally, the amount of the transesterification catalyst is in a range from 0.1 wt % to 5 wt % of the inorganic oxyacid ester.

Optionally, the upper limit of amount of the transesterification catalyst is 0.2 wt %, 0.5 wt %, 0.8 wt %, 1.0 wt %, 1.5 wt %, 2.0 wt %, 2.5 wt %, 3.0 wt %, 3.5 wt %, 4.0 wt %, 4.5 wt % or 5.0 wt % of the inorganic oxyacid ester, and the lower limit thereof is 0.1 wt %, 0.2 wt %, 0.5 wt %, 0.8 wt %, 1.0 wt %, 1.5 wt %, 2.0 wt %, 2.5 wt %, 3.0 wt %, 3.5 wt %, 4.0 wt % or 4.5 wt % of the inorganic oxyacid ester.

Optionally, the transesterification catalyst is at least one of acidic catalyst and basic catalyst.

Optionally, the acidic catalyst includes at least one of alcohol-soluble acid, solid acid, aluminum alkoxide, aluminum phenoxide, tetrabutyl stannate, titanium alkoxide, zirconium alkoxide, ethyl antimonite and butyl antimonite; and the basic catalyst includes at least one of alcohol-soluble base and solid base.

Optionally, the alcohol-soluble acid is an acid that is easily soluble in alcohol.

Optionally, the alcohol-soluble base is a base that is easily soluble in alcohol.

Optionally, the alcohol-soluble acid includes sulfuric acid, sulfonic acid and the like.

Optionally, the alcohol-soluble base includes NaOH, KOH, NaOCH$_3$, organic base and the like.

Optionally, the transesterification catalyst is: a basic catalyst including bases that are easily soluble in alcohol (such as NaOH, KOH, NaOCH$_3$, organic bases and so on) and various solid base catalysts; and an acidic catalyst including acids that are easily soluble in alcohol (such as sulfuric acid, sulfonic acid and so on) and various solid acidic catalysts, aluminum alkoxide, aluminum phenoxide, tetrabutyl stannate, titanium alkoxide, zirconium alkoxide, ethyl antimonite, butyl antimonite and so on. And the amount of the transesterification catalyst is in a range from 0.1 wt % to 5 wt % of the inorganic oxyacid ester.

Optionally, the conditions for the transesterification are: a reaction temperature ranges from 80 to 180° C., and a reaction time ranges from 2 to 10 hours in an inactive atmosphere.

Optionally, the inactive atmosphere includes at least one of nitrogen and inert gas atmosphere.

Optionally, the inactive atmosphere is nitrogen atmosphere.

Optionally, the transesterification is carried out under stirring condition.

Optionally, the upper limit of the reaction temperature is 85° C., 90° C., 100° C., 110° C., 120° C., 130° C., 140° C., 150° C., 160° C., 170° C., 175° C. or 180° C., and the lower limit thereof is 80° C., 85° C., 90° C., 100° C., 110° C., 120° C., 130° C., 140° C., 150° C., 160° C., 170° C. or 175° C.

Optionally, the upper limit of the reaction time is 3 hours, 4 hours, 5 hours, 6 hours, 7 hours, 8 hours, 9 hours or 10 hours, and the lower limit thereof is 2 hours, 3 hours, 4 hours, 5 hours, 6 hours, 7 hours, 8 hours or 9 hours.

Optionally, the conversion rate of the transesterification ranges from 60% to 80%.

Optionally, the conditions for the transesterification further comprise performing vacuum distillation thereafter.

Optionally, the conditions of the vacuum distillation comprise: a vacuum degree ranges from 0.01 to 5 kPa, a vacuum distillation temperature ranges from 170 to 230° C., and a vacuum distillation time ranges from 0.5 to 5 hours.

Optionally, in the vacuum distillation process, the upper limit of the vacuum degree is 0.02 kPa, 0.05 kPa, 0.1 kPa, 0.5 kPa, 1 kPa, 2 kPa, 3 kPa, 4 kPa, 4.5 kPa or 5 kPa, and the lower limit thereof is 0.01 kPa, 0.02 kPa, 0.05 kPa, 0.1 kPa, 0.5 kPa, 1 kPa, 2 kPa, 3 kPa, 4 kPa or 4.5 kPa.

Optionally, in the vacuum distillation process, the upper limit of the vacuum distillation temperature is 175° C., 180° C., 190° C., 200° C., 210° C., 220° C., 225° C. or 230° C., and the lower limit thereof is 170° C., 175° C., 180° C., 190° C., 200° C., 210° C., 220° C. or 225° C.

Optionally, in the vacuum distillation process, the upper limit of the vacuum distillation time is 0.8 hours, 1 hours, 2 hours, 3 hours, 4 hours, 4.5 hours or 5 hours, and the lower limit thereof is 0.5 hours, 0.8 hours, 1 hours, 2 hours, 3 hours, 4 hours or 4.5 hours.

Optionally, the conversion rate of the transesterification is greater than 90%.

Optionally, the method comprises:
a) mixing inorganic oxyacid ester, polyhydric alcohol and transesterification catalyst, and then performing the transesterification under stirring conditions and in an inactive protection atmosphere, wherein the reaction temperature ranges from 80 to 180° C., and the reaction time ranges from 2 to 10 hours;
b) after the reaction in step a), performing vacuum distillation during which the vacuum degree ranges from 0.01 to 5 kPa, the reaction temperature ranges from 170 to 230° C., and the reaction time ranges from 0.5 to 5 hours.

As a specific embodiment, the method comprises:
1) mixing inorganic oxyacid ester, polyhydric alcohol and transesterification catalyst uniformly in a three-necked flask, and performing the transesterification under stirring conditions during which a distillation device is connected to the three-necked flask and nitrogen is passed in the three-necked flask for protection, wherein the reaction temperature ranges from 80 to 180° C., the reaction time ranges from 2 to 10 hours, and the conversion rate of the transesterification ranges from 60% to 80%;
2) after step 1), connecting the distillation device to the water pump or oil pump for vacuum distillation to make the transesterification more complete, wherein the vacuum degree is controlled to range from 0.01 to 5 kPa, the reaction temperature ranges from 170 to 230° C., the reaction time ranges from 0.5 to 5 hours, and the conversion rate of the transesterification is greater than 90%.

Optionally, the initial decomposition temperature of the polyester polyol is higher than 300° C.

Optionally, the initial decomposition temperature of the polyester polyol reaches 500° C.

In the present application, "$C_1 \sim C_8$" and the like all refer to the number of carbon atoms contained in the alkyl group.

In the present application, "alkyl" is a group formed by the loss of any hydrogen atom on the molecule of an alkane compound.

In the present application, the "initial decomposition temperature" refers to the temperature at which the polyester polyol has an obvious weight loss peak through thermogravimetric analysis.

The beneficial effects that the present application can achieve comprise:
1) The present application uses inorganic oxyacid esters and polyhydric alcohol as raw materials to perform transesterification to obtain a new type of polyester polyol polymer;
2) The polyester polyol polymer prepared in the present application has good heat resistance, the initial decomposition temperature thereof can reach 500° C., and it can be used in fields that require high heat resistance.

DETAILED DESCRIPTION

Figure 1:
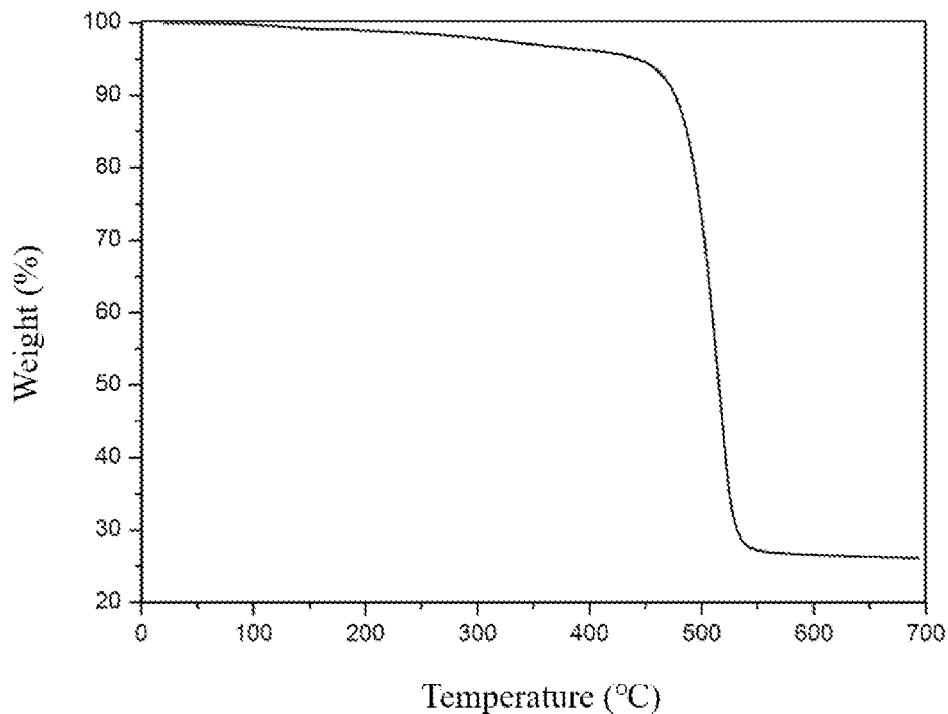
FIG. 1 is a thermal analysis diagram of the product synthesized in Example 1 of the present application.

The present application will be described in detail below with reference to the examples, but the present application is not limited to these examples.

Unless otherwise specified, the raw materials in the examples of the present application are all commercially available.

The analysis methods in the examples of the present application are as follows.

Thermogravimetric analysis is conducted by TA Q-600 thermogravimetric analyzer produced by TA Instruments. The nitrogen flow rate is 100 ml/min, and the temperature is increased to 700° C. at a temperature rise rate of 10° C./min.

The conversion rate of the transesterification in the examples of the present application is calculated as follows: according to the number of moles n of the by-product alcohols distilled out during the reaction, the number of groups participating in the transesterification is determined to be n, and the total number of moles of esters in the reaction raw materials is m, and then the conversion rate of the transesterification is n/xm. x depends on the number of alkoxy groups connected to the central atom in the esters.

According to an embodiment of the present application, the polyester polyol polymer and the method for preparing the same are characterized in that the method includes the following steps:

a) mixing inorganic oxyacid ester, polyhydric alcohol and transesterification catalyst uniformly in a three-necked flask, and performing the transesterification under stirring conditions during which a distillation device is connected to the three-necked flask and nitrogen is passed in the three-necked flask for protection, wherein the reaction temperature ranges from 80 to 180° C., the reaction time ranges from 2 to 10 hours, and the conversion rate of the transesterification ranges from 60% to 80%;

b) after step a), connecting the distillation device to the water pump or oil pump for vacuum distillation to make the transesterification more complete, wherein the vacuum degree is controlled to range from 0.01 to 5 kPa, the reaction temperature ranges from 170 to 230° C., the reaction time ranges from 0.5 to 5 hours, and the conversion rate of the transesterification is greater than 90%.

Optionally, the formula of the inorganic oxyacid ester in step a) is $M(OR)_n$, wherein M is B, Si, Ge, P, Al, Ti, Fe, Sn, V, Ga, Zr, Cr, Sb, W; R is any one of "$C_1$ to $C_8$" alkyl groups; and the inorganic oxyacid ester comprises at least one of trimethyl borate, triethyl borate, tripropyl borate, tributyl borate, tri-n-hexyl borate, triisooctyl borate, trioctyl borate, tetramethoxysilane, tetraethyl orthosilicate, tetrapropyl silicate, tetrabutyl silicate, ethyl orthogermanate, triethyl phosphate, tripropyl phosphate, tributyl phosphate, tri-n-pentyl phosphate, trihexyl phosphate, aluminium ethoxide, aluminum isopropoxide, aluminum n-butoxide, aluminum tert-butoxide, tetraethyl titanate, tetraisopropyl titanate, tetrabutyl titanate, tetrahexyl titanate, tetraisooctyl titanate, tetrabutyl ferrite, tetrabutyl stannate, butyl orthovanadate, gallium ethoxide, tetra-n-propyl zirconate, tetrabutyl zirconate, tert-butyl chromate, ethyl antimonite, butyl antimonate, tungsten ethoxide and tungsten isopropoxide.

Optionally, the formula of the polyhydric alcohol in step a) is $R—(OH)_x$, wherein $x \geq 2$; the polyhydric alcohol comprises at least one of ethylene glycol, diethylene glycol, triethylene glycol, tetraethylene glycol, 1,2-propanediol, 1,3-propanediol, 1,4-butylene glycol, 1,6-hexanediol, polyethylene glycol 200, polyethylene glycol 400, polyethylene glycol 600, polyethylene glycol 800, 1,4-cyclohexanediol, 1,4-cyclohexane dimethanol, terephthalyl alcohol, glycerin, trimethylolpropane, pentaerythritol, xylitol and sorbitol.

Optionally, in the step a), the molar ratio of the inorganic oxyacid ester to the polyhydric alcohol satisfies: $M(OR)_n/R—(OH)_x = (0.8 \sim 1.2) x/n$.

Optionally, the transesterification catalyst used in the step a) is: a basic catalyst including bases that are easily soluble in alcohol (such as NaOH, KOH, $NaOCH_3$, organic bases and so on) and various solid base catalysts; and an acidic catalyst including acids that are easily soluble in alcohol (such as sulfuric acid, sulfonic acid and so on) and various solid acidic catalysts, aluminum alkoxide, aluminum phenoxide, tetrabutyl stannate, titanium alkoxide, zirconium alkoxide, ethyl antimonite, butyl antimonite and so on; and the amount of the transesterification catalyst is in a range from 0.1 wt % to 5 wt % of the inorganic oxyacid ester.

Optionally, the step a) is carried out under nitrogen protection, the reaction temperature thereof ranges from 80 to 180° C., and the reaction time thereof ranges from 2 to 10 hours.

Optionally, the conversion rate of the transesterification in step a) ranges from 60% to 80%.

Optionally, the step b) is carried out under vacuum distillation conditions, and the vacuum degree thereof ranges from 0.01 to 5 kPa.

Optionally, in step b), the reaction temperature ranges from 170 to 230° C., and the reaction time ranges from 0.5 to 5 hours.

Optionally, the conversion rate of the transesterification in step b) is greater than 90%.

Example 1

10 g 1,3-propanediol, 6.84 g tetraethyl orthosilicate and 5 g tetramethoxysilane are added to a three-necked flask which is connected to a distillation device. 0.12 g concentrated sulfuric acid as catalyst is added dropwise in the three-necked flask under stirring condition. The temperature is heated up to 100° C. under nitrogen protection, and the reaction time is 6 hours. During this process, a large amount of methanol and ethanol are distilled out, and the conversion rate of the transesterification reaction is 75%. Then a vacuum device is connected to distillation device and the transesterification continues under vacuum distillation conditions, wherein the vacuum degree of the reaction system was controlled to be 1 kPa and the temperature was raised to 170° C. After reacting for 1 hour, the transesterification is stopped. After the temperature is naturally cooled to be room temperature, the resulting sample is taken, and the conversion rate of the transesterification is 93%.

Example 2

5 g ethylene glycol and 8.7 g aluminum ethoxide are added to a three-necked flask which is connected to a distillation device, wherein the aluminum ethoxide is used not only as an inorganic oxyacid salt raw material, but also as a transesterification catalyst. The temperature is heated up to 175° C. under nitrogen protection and stirring condition, and the reaction time is 5 hours. During this process, a large amount of ethanol is distilled out, and the conversion rate of the transesterification reaction is 73%. Then a vacuum device is connected to distillation device and the transesterification continues under vacuum distillation conditions, wherein the vacuum degree of the reaction system was controlled to be 0.1 kPa and the temperature was raised to 210° C. After reacting for 1 hour, the transesterification is stopped. After the temperature is naturally cooled to be room temperature, the resulting sample is taken, and the conversion rate of the transesterification is 92%.

Example 3

10 g terephthalyl alcohol and 9.07 g tripropyl borate are added to a three-necked flask which is connected to a distillation device. 0.05 g tetrabutyl titanate as catalyst is added dropwise in the three-necked flask under stirring condition. The temperature is heated up to 180° C. under nitrogen protection, and the reaction time is 6 hours. During this process, a large amount of propanol is distilled out, and the conversion rate of the transesterification reaction is 75%. Then a vacuum device is connected to distillation device and the transesterification continues under vacuum distillation conditions, wherein the vacuum degree of the reaction system was controlled to be 1 kPa and the temperature was raised to 230° C. After reacting for 1 hour, the transesterification is stopped. After the temperature is naturally cooled to be room temperature, the resulting sample is taken, and the conversion rate of the transesterification is 93%.

Examples 4 to 13

The specific raw materials, amounts thereof and reaction conditions different from Example 1 are shown in Table 1 below, and the other procedures are the same as those in Example 1.

Example 5 Thermogravimetric Analysis

Figure 2:
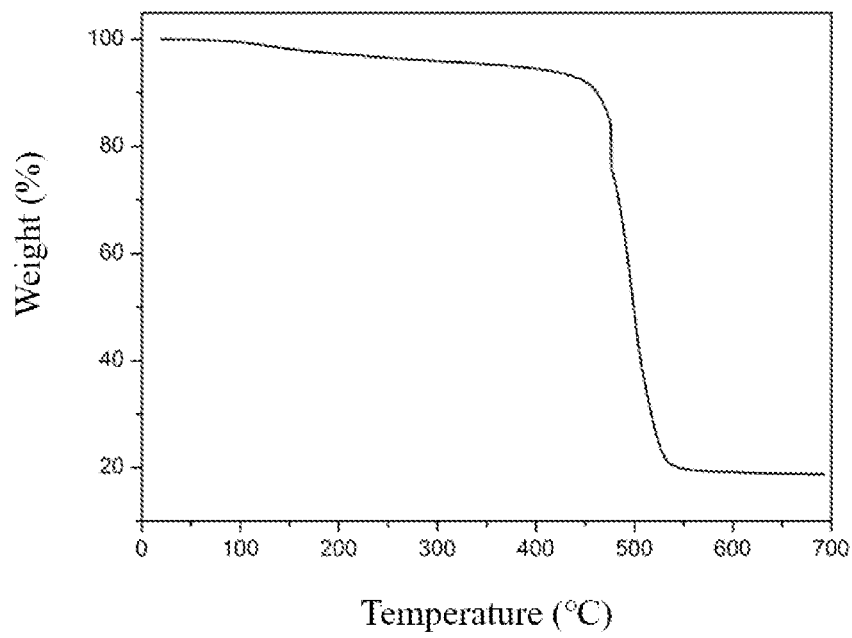
FIG. 2 is a thermal analysis diagram of the product synthesized in Example 2 of the present application.

The polyester polyol prepared in Example 1 to Example 13 are subjected to thermogravimetric analysis respectively, results of which are typically shown in FIGS. 1 and 2. FIG. 1 shows the thermal analysis curve of the polyester polyol prepared in Example 1. It can be seen from the figure that the initial decomposition temperature of the polyester polyol prepared in Example 1 is 500° C.

FIG. 2 shows the thermal analysis curve of the polyester polyol prepared in Example 2. It can be seen from the figure that the initial decomposition temperature of the polyester polyol prepared in Example 2 is 500° C.

The results of the polyester polyol prepared in other examples are similar to the above, and the initial decomposition temperature of the polyester polyol is higher than 300° C.

The above examples are only illustrative, and do not limit the present application in any form. Any change or modification, made by the skilled in the art based on the technical content disclosed above, without departing from the spirit of the present application, is equivalent example and falls within the scope of the present application.

The invention claimed is:

1. A method for preparing a polyester polyol comprising performing transesterification of an inorganic oxyacid ester and a polyhydric alcohol as raw materials to obtain the polyester polyol;

wherein the method comprises the following steps:
a) mixing the inorganic oxyacid ester, the polyhydric alcohol and a transesterification catalyst, and then performing a transesterification reaction under stirring conditions and in an inert atmosphere, wherein the reaction temperature ranges from 80 to 180° C., and the reaction time ranges from 2 to 10 hours;
b) after the reaction in step a), performing vacuum distillation during which the vacuum degree ranges from

TABLE 1

Raw materials, amounts thereof and reaction conditions of Examples 4 to 13

| | Transesterification | | | | | Vacuum distillation | | |
|---|---|---|---|---|---|---|---|---|
| Example Number | Inorganic oxyacid ester | Polyhydric alcohol | Catalyst | Reaction temperature | Reaction time | Vacuum degree | Reaction temperature | Reaction time |
| 4 | Tetrahexyl titanate, 0.1 mol | Diethylene glycol, 0.2 mol | NaOH, 0.03 g | 80° C. | 10 hours | 5 kPa | 180° C. | 2 hours |
| 5 | Triethyl phosphate, 0.2 mol | Polyethylene glycol 200, 0.3 mol | Na$_2$CO$_3$, 0.1 g | 100° C. | 5 hours | 2 kPa | 200° C. | 0.5 hours |
| 6 | Tetrabutyl stannate, 0.15 mol | Trimethylolpropane, 0.2 mol | Sulfonic acid, 0.06 g | 150° C. | 2 hours | 0.01 kPa | 175° C. | 5 hours |
| 7 | Tungsten ethoxide, 0.2 mol | Xylitol, 0.1 mol | Tetrabutyl stannate, 0.02 g | The one in Example 1 | The one in Example 1 | The one in Example 1 | The one in Example 1 | The one in Example 1 |
| 8 | Tetrabutyl ferrite, 0.1 mol | 1,4-butanediol, 0.2 mol | Ethyl antimonite, 0.04 g | The one in Example 1 | The one in Example 1 | The one in Example 1 | The one in Example 1 | The one in Example 1 |
| 9 | Butyl orthovanadate, 0.1 mol | Glycerol, 0.2 mol | Butyl antimonite, 0.02 g | The one in Example 1 | The one in Example 1 | The one in Example 1 | The one in Example 1 | The one in Example 1 |
| 10 | Gallium ethoxide, 0.4 mol | Pentaerythritol, 0.3 mol | The one in Example 1 | The one in Example 1 | The one in Example 1 | The one in Example 1 | The one in Example 1 | The one in Example 1 |
| 11 | Tetra-n-propyl zirconate, 0.2 mol | Cyclohexanediol, 0.4 mol | The one in Example 1 | The one in Example 1 | The one in Example 1 | The one in Example 1 | The one in Example 1 | The one in Example 1 |
| 12 | Tert-Butyl chromate, 0.1 mol | The one in Example 1, 0.1 mol | The one in Example 1 | The one in Example 1 | The one in Example 1 | The one in Example 1 | The one in Example 1 | The one in Example 1 |
| 13 | Ethyl antimonite, 0.4 mol | The one in Example 1, 0.3 mol | The one in Example 1 | The one in Example 1 | The one in Example 1 | The one in Example 1 | The one in Example 1 | The one in Example 1 |

0.01 to 5 kPa, the reaction temperature ranges from 170 to 230° C., and the reaction time ranges from 0.5 to 5 hours;

wherein a molar ratio of inorganic oxyacid ester, polyhydric alcohol and transesterification catalyst satisfies: inorganic oxyacid ester:polyhydric alcohol=(0.8~1.2) $n^3/x$, wherein x is the number of moles of alkoxyl groups contained in each mole of inorganic oxyacid ester, and $n^3$ is the number of moles of hydroxyl groups contained in each mole of polyhydric alcohol.

2. The method according to claim 1, wherein the inorganic oxyacid ester is at least one of compounds having a chemical formula shown in Formula I and Formula II, $$M(OR^1)_n^1 \qquad \text{Formula I}$$

$$O=P(OR^2)_n^2 \qquad \text{Formula II}$$

wherein, M is a metal element or a non-metal element that does not include P, $R^1$ and $R^2$ are independently selected from at least one of $C_1$ to $C_8$ alkyl groups, $n^1$=2~8, $n^2$=2~8.

3. The method according to claim 2, wherein M is B, Si, Ge, Al, Ti, Fe, Sn, V, Ga, Zr, Cr, Sb or W.

4. The method according to claim 1, wherein the inorganic oxyacid ester comprises at least one of trimethyl borate, triethyl borate, tripropyl borate, tributyl borate, tri-n-hexyl borate, triisooctyl borate, trioctyl borate, tetramethoxysilane, tetraethyl orthosilicate, tetrapropyl silicate, tetrabutyl silicate, ethyl orthogermanate, triethyl phosphate, tripropyl phosphate, tributyl phosphate, tri-n-pentyl phosphate, trihexyl phosphate, aluminium ethoxide, aluminum isopropoxide, aluminum n-butoxide, aluminum tert-butoxide, tetraethyl titanate, tetraisopropyl titanate, tetrabutyl titanate, tetrahexyl titanate, tetraisooctyl titanate, tetrabutyl ferrite, tetrabutyl stannate, butyl orthovanadate, gallium ethoxide, tetra-n-propyl zirconate, tetrabutyl zirconate, tert-butyl chromate, ethyl antimonite, butyl antimonate, tungsten ethoxide and tungsten isopropoxide.

5. The method according to claim 1, wherein the number of hydroxyl groups in the polyhydric alcohol is not less than two.

6. The method according to claim 1, wherein the polyhydric alcohol comprises at least one of ethylene glycol, diethylene glycol, triethylene glycol, tetraethylene glycol, 1,2-propanediol, 1,3-propanediol, 1,4-butylene glycol, 1,6-hexanediol, polyethylene glycol 200, polyethylene glycol 400, polyethylene glycol 600, polyethylene glycol 800, 1,4-cyclohexanediol, 1,4-cyclohexane dimethanol, terephthalyl alcohol, glycerin, trimethylolpropane, pentaerythritol, xylitol and sorbitol.

7. The method according to claim 1, wherein an amount of the transesterification catalyst is in a range from 0.1 wt % to 5 wt % of the inorganic oxyacid ester.

8. The method according to claim 1, wherein the transesterification catalyst is at least one of acidic catalyst and basic catalyst.

9. The method according to claim 8, wherein the acidic catalyst comprises at least one of alcohol-soluble acid, solid acid, aluminum alkoxide, aluminum phenoxide, tetrabutyl stannate, titanium alkoxide, zirconium alkoxide, ethyl antimonite and butyl antimonite; and the basic catalyst comprises at least one of alcohol-soluble base and solid base.

10. The method according to claim 1, wherein an initial decomposition temperature of the polyester polyol is higher than 300° C.

11. The method according to claim 10, wherein an initial decomposition temperature of the polyester polyol reaches 500° C.

* * * * *